US007661574B1

(12) United States Patent
McGushion

(10) Patent No.: US 7,661,574 B1
(45) Date of Patent: Feb. 16, 2010

(54) ORBITAL TUBE WELDING CLAMPING FIXTURE SUPPORT

(75) Inventor: Kevin David McGushion, Simi Valley, CA (US)

(73) Assignee: Arc Machines, Inc., Pacoima, CA (US)

( * ) Notice: Subject to any disclaimer, the term of this patent is extended or adjusted under 35 U.S.C. 154(b) by 291 days.

(21) Appl. No.: 11/269,970

(22) Filed: Nov. 9, 2005

(51) Int. Cl.
*B23K 1/18* (2006.01)
(52) U.S. Cl. .................................. 228/49.3; 228/44.5
(58) Field of Classification Search ............... 228/49.3, 228/44.5; 70/14, 18, 19, 58
See application file for complete search history.

(56) References Cited

U.S. PATENT DOCUMENTS

| 5,196,664 A | 3/1993 | McGushion |
| 5,422,456 A | 6/1995 | Dahm |
| 5,824,983 A | 10/1998 | Huddleston |
| 6,646,219 B2 * | 11/2003 | Kane et al. ................. 219/60 A |

FOREIGN PATENT DOCUMENTS

DE  3931783  * 4/1991

* cited by examiner

*Primary Examiner*—Jessica L. Ward
*Assistant Examiner*—Nicholas P D'Aniello
(74) *Attorney, Agent, or Firm*—Aaron P. McGushion

(57) ABSTRACT

A clamping means support for use with orbital tube welding that resists the outward flexure of abutting tubes is provided. The invention generally is comprised of a left clasp and a right clasp, being congruent. The right clasp is generally square cornered J-shaped, having a mounting leg, and an engaging leg, an engagement notch formed between the long leg and the short leg. The right clasp is fastened upright, at the mounting leg, to a right top side of a clamping means. The left clasp is fastened invertible, at the mounting leg, to a left top side of a clamping means. Wherein, in the closed position, the engagement leg of the right clasp interlocks within the engagement notch of the left clasp, effectively preventing outward movement of the right top side and the left top side of the clamping means, relative one to the other.

5 Claims, 5 Drawing Sheets

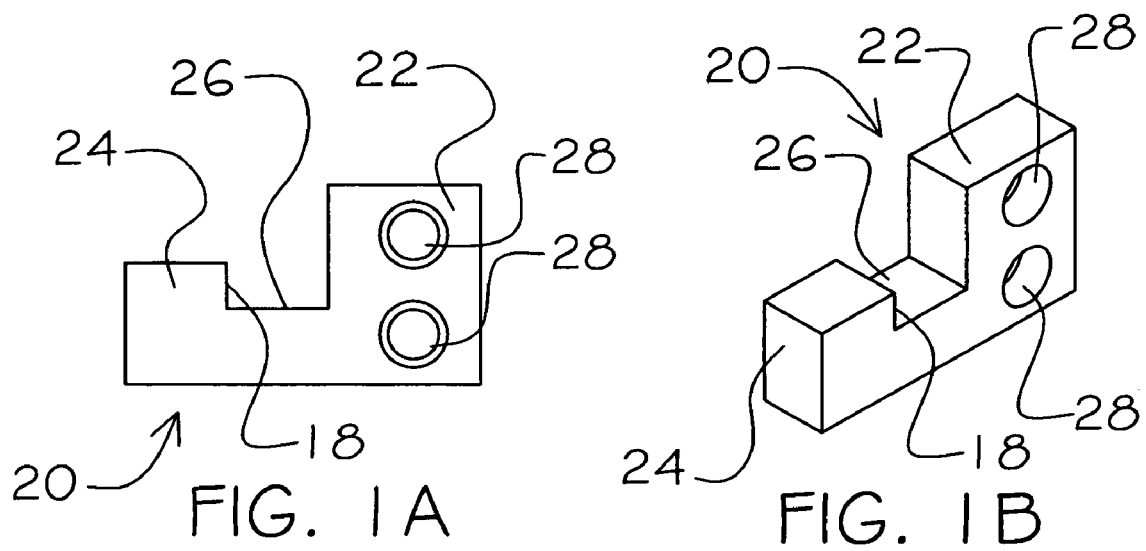
FIG. 1A
FIG. 1B
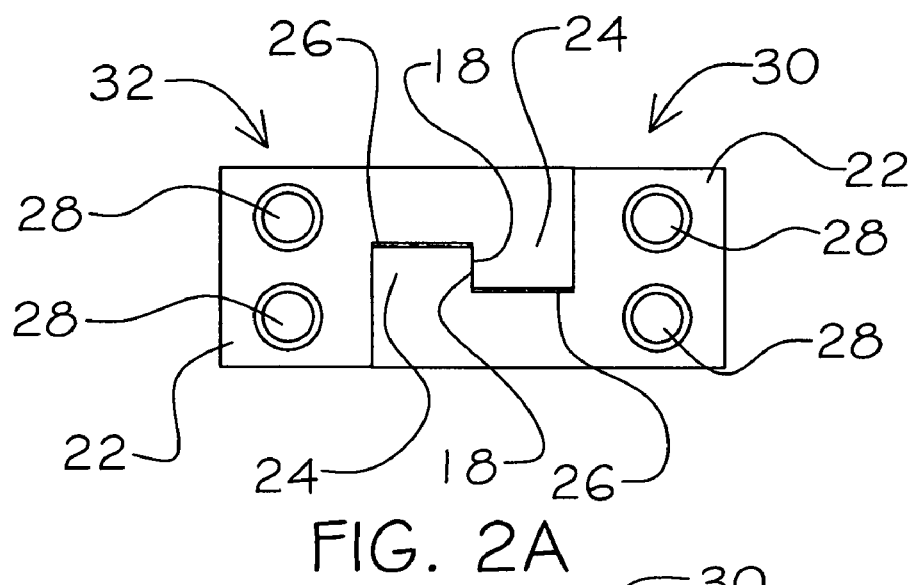
FIG. 2A
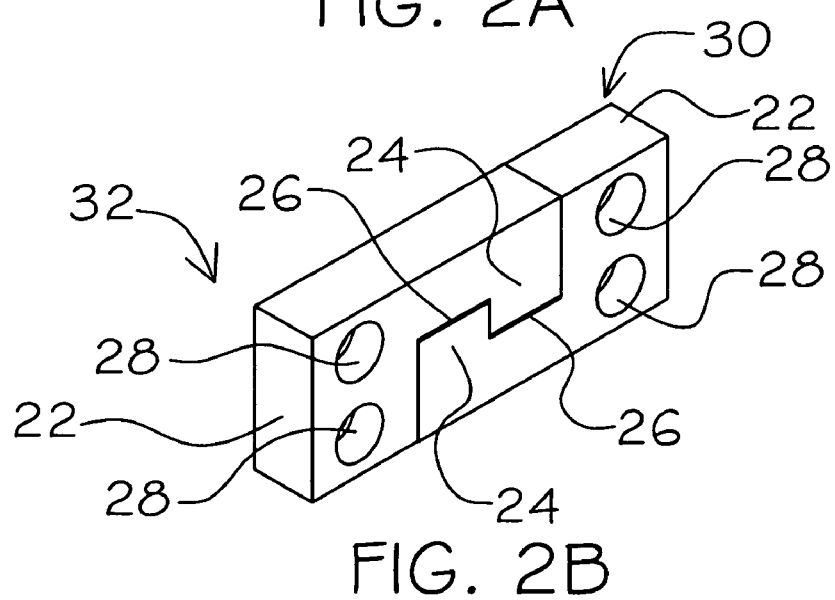
FIG. 2B

ORBITAL TUBE WELDING CLAMPING FIXTURE SUPPORT

FIELD OF THE INVENTION

This invention relates generally to a clamping means for welding together metal tubular components and method for use thereof, and, more particularly, to a device that prevents flexure and separation of the clamping means and the tubular components affixed thereto, due to component weight stresses and welding induced forces.

BACKGROUND OF THE INVENTION

In high purity applications, it is common to use an orbital welding device, such as the device disclosed in U.S. Pat. No. 5,196,664 to McGushion (1993), to butt-weld together two components with annular cross sections, held together end to end by a clamping means. The components could include pipes, tubes, or tubular extensions protruding from components, such as regulators, valves, mass flow controllers/meters, or a wide variety of other similar components with a tube-like extension. Tube is used interchangeably for any of the above mentioned components.

The clamping means has primarily two sides, each side clamping one tube. Each side being normally comprised of two sections, top and bottom. Wherein the top and bottom are clamped together, with a tube interposed, lying within semicylinders formed through the mating faces of the top and bottom parts, or through interchangeable inserts fastened to the top and bottom. The semicylinder radius substantially matches the radius of the pipe. The semicylinder is designed to prevent significant lateral movement of the tube, relative to the semicylinder.

The two bottom sides are fastened together, with a spacer between them, bringing. The complete clamping means, including the two sides and the spacer, is assembled, and the tubes inserted between the top and bottom of each side. The top and bottom for each side can be hinged on one side to allow the top to swivel open, to receive the tube, the opposing side having a clamping mechanism, to draw the top down towards the bottom, engaging the tube. Alternately, the top portion can be separable from the bottom, with a camping means on both sides; or a latching means on one side and a clamping means on the opposing side.

The orbital welding device is inserted between the two sides, the sides straddling the C-shaped tip of the orbital welding device, the spacer being slightly thicker than the C-shaped tip. The electrode of the orbital welding device is substantially aligned with the seam, protruding from a C-shaped gear within the C-shaped tip. When welding, an arc is formed between the electrode and the seam of the tubes. The electrode orbits the seam, melting the parent material, resulting in the fusion of the two tubes at the seam.

Often, it is the case that two tubes in a complex system need to be welded together, in a very limited space, such as found in the semiconductor and aerospace industries. Therefore, for these applications, the orbital welders and clamping means are designed to occupy a limited space, preferably making them as small as possible. The thickness of the clamping means, as well as the overall dimensions, are often minimized, increasing compactness, but reducing overall strength.

When welding together long lengths of tubing or heavy components, the two sections, prior to welding, tend to exert a downward force, causing the top section on one or both sides to flex out, away from the seam. The outward flexure allows the two tubes to separate, causing a gap in the seam to form. On average, a gap of less 10% of the wall thickness can cause severe weld degradation. So, it is of great importance to eliminate this flexure to minimize or eliminate any significant gap.

The clamping means described previously allows for slight, but unacceptable, movement of the tubes during welding, because of its light construction. This is due to each of the top side pivoting outwardly in relation to the bottom sides. The hinges and clamping mechanisms fastening the top sides to the bottom sides cannot effectively prevent this skewing.

The resulting gap can degrade the weld, or cause it to fail completely. The ends of the two tubes need to be squarely butted one against the other, with minimal gap, continuously throughout the weld. An unacceptably wide gap in the seam can result in an uneven weld bead, having less parent material in that general area, or a an actual hole or permanent gap can be formed in the resulting cured weld bead. It can also result in a blowout of the weld, if an internal purge is utilized. All of these conditions, as well as others, can cause a weld to be rejected by quality control, costing an unacceptable loss in time and money.

To prevent a gap in the seam, several devices have been made to securely hold the tubes in abutment, resisting the pull exerted on the tubes. These designs, although preventing significant outward movement of the top sides, either introduce new undesirable effects or do not fully satisfy industry requirement. These requirements include: a clamping means that securely holds two tubes in abutment without significant gap, a lightweight clamping means, a clamping means that is compact and able to fit into confined spaces, and a clamping means that can operate with the tubes being clamped, one before the other, in any order, depending on what is immediately needed.

In an attempt to strengthen the clamping means, existing designs were made substantially larger than preceding designs. The overall size, thickness, and weight of the clamping means were increased. This heavy design decreased flexure and provided an allowable seam for which to weld. However, this heavy design was large, and could not be used in tight situations. Thus, the heavy design was limited in its applications. Additionally, the large, heavy clamping means design required a larger orbital welding device to mate effectively with the camping means during a weld. The overall size and weight of a setup increased significantly.

In another attempt to minimize fixture size and prevent outward flexure during the weld, a series of tack welds are applied around the seam, in a process called pre-tacking. Pre-tacking is a preliminary operation to the weld; therefore, requiring much more time to complete a weld.

Additionally, the presence of tack welds can be detected after the weld has been completed. Witness marks are evident in the finished weld, a thickening of the weld bead at the point of the tack weld. Since it is desirable to have a smooth, continuous weld bead, pre-tacking is not ideal. Moreover, pre-tacking often introduces additional impurities, compared to a continuous weld bead.

An additional existing design can be seen in U.S. Pat. No. 5,824,983 to Huddleston (1998). The bottom sides of the clamping assembly are affixed to the weld head; and the top sides are hinged to the bottom sides. The top sides are rigidly connected one to the other, across the top of the fixture, by a bracing plate.

Although this significantly reduces the outward flexing of the fixture, the design of the plate limits the usage of this device. Often, it is necessary to clamp one tube before the other in a welding setup; where one side of the clamping means is closed and fastened before the other. Huddleston, as well as other similar designs, are limited to clamping both sides simultaneously. When welding a tube to a stationary assembly of components, it is often more advantageous to clamp the assembly side of the tube junction, leaving the opposing clamping means side open. The clamping means, attached to the assembly, can be left in place, without being manually held, while the tube is prepared, and later clamped within the opposing side of the clamping means. Depending on clearance issues and individual setup needs for the preparation of each welding joint, it may be preferable to have either one of the sides closed before the other.

In other attempts to solve the problem of clamping means flexure, a bracing plate similar to Huddleston is employed. Instead of being fastened to both sides of the clamping means, synchronizing their actions, the bracing plate is fastened to just one side. The plate extends to the opposing side, engaging the opposing side with a clasping means, preventing both sides from outwardly flexing.

Again, this clasping device prevents flexure. However, the design restricts the use of the clamping means, a specified sequence of side closure. The side with the bracing plate attached, must be closed secondly, after the opposing side. Because the bracing plate is designed to engage the opposing side from above, this clamping sequence is required. This design would be difficult or impossible to use in restricted setups.

What is needed is a clamping means support for orbital tube welding that resists the outward flexure of the adjoining tubes, minimizing the gap in the seam formed between the tubes. What is also needed is a clamping means support that allows for either side of the clamping means to be engaged in any order, responding to each particular situation, and providing flexibility in use. What is additionally needed is a clamping means support that is lightweight and compact, able to be easily supported in close quarters by hand or by clamping one side to a stationary pipe assembly.

SUMMARY OF THE INVENTION

In accordance with the present invention, a clamping means support for use with orbital tube welding that resists the outward flexure of abutting tubes is provided. The invention generally is comprised of a left clasp and a right clasp, the left clasp being congruent to the right clasp. The right clasp is generally square cornered J-shaped, having a mounting leg on the long leg, an engaging leg on the short leg, a web extending between the engaging leg and the mounting leg, an engagement notch being formed by the engaging leg, the mounting leg, and the web. The right clasp is fastened upright, at the mounting leg, to a right top side of a clamping means, preferably on the hinged side. The left clasp is fastened invertible, at the mounting leg, to a left top side of a clamping means, again on the hinged side. Wherein, when the right top side and left top side of the clamping means are in the closed position, the engagement leg of the right clasp interlocks within the engagement notch of the left clasp, effectively preventing outward movement of the right top side and the left top side of the clamping means, relative one to the other. Although, the terms top, bottom, right, and left are used throughout the description of the present invention, they do not indicate the orientation of the clamping means as a whole. The clamping means may be used in numerous orientations, while maintaining a similar function.

In a preferred embodiment, the design of the right clasp and left clasp are identical, clasp being used to generically describe both. The clasp may be constructed from material, such as aluminum, steel, or any other of a variety of appropriately rugged materials. The thickness of the material should satisfy two requirements. The first requirement is sufficient tensile strength to resist outward flexing of the two sides of the clamping means. The second requirement is sufficient thickness of the clasp to provide an engagement face along the width of the inside mating face. When a load is applied to the clamping means, causing an outward flexing stress on the top sides, the right engagement face contacts the left engagement face.

The clasp has a mounting leg, generally rectangular in shape. The mounting leg should be sufficiently long to prevent substantial rotation, once mounted. The mounting leg can be mounted to a clamping means by any number of fastening means, including dovetail mortise and tenon means, threaded means, adhesives, or welds. In a preferential design, two countersunk holes are formed through the mounting leg to receive two corresponding screws, the clamping means having threaded holes to receive the screws. The positions of the countersunk holes on the long leg are preferably symmetric; wherein the clasp can be mounted upright or invertible, without substantially changing the vertical position of the clasp relative the top side of the clamping means.

The division between the top side and bottom side, for the right and left sides, of the clamping means forms a pivot axis, at the hinge and latch, about which the top side pivots out. The position of the clasp mount should be sufficiently distant from the pivot axis to provide adequate resistive force to the torque produced about the pivot axis, by the outward flexing of the top sides.

The left clasp is mounted invertible compared to the right clasp. The left clasp is mounted to the left top side; and the right clasp is mounted to the right top side, on the hinge sides. When the top left side and top right side of the clamping means are in the closed position, the engagement leg of the right clasp interlocks within the engagement notch of the left clasp, the two engaged clasps forming a substantially rectangular resultant shape.

To facilitate the opening and closure of both the right top side and left top side, in any sequence, a clearance is provided between the right engagement face and the left engagement face. Additionally, the length and width of the engaging leg is less than the length and width of the engagement notch, respectively. This allows the engagement leg of one clasp to clear the engagement notch of the opposing clasp, as one top side is swiveled about its hinge, to the open position.

In one possible usage scenario of the present invention, a new tube is designated to be welded to an existing tube extending from a complex assembly. The right side of the clamping means, with the right clasp attached, is clamped to the existing tube, and locked in the closed position by the latch. The new tube is prepared, and then inserted into the left side of the clamping means, with the left clasp attached. The position and geometry of the identical, but inverted clasps provide for ample clearance to allow the opening or closure of either side in any sequence. The clearance between the right engagement face and the left engagement face is sufficient to prevent mechanical interference during opening and closure; however, that clearance is minimized to prevent outward flexure of both top sides of the clamping means.

The clasp of the present invention can also be constructed with the engaging leg and the mounting leg having substantially the same length. In order for the engaging leg of one clasp to engage with the engaging notch of the opposing clasp, the clasps must be mounted in a staggered relationship, wherein one clasp is mounted lower, on its respective top side, than the opposing top side. In this arrangement, the right clasp and the left clasp can engage and disengage without significantly interfering with one another.

In an alternate embodiment of the present invention, a square cornered U-shaped retainer is provided. A mortise is formed on the outside face of each top side of the clamping means, both mortises are in approximately the same position on their respective top sides and parallel. Each mortise receives one leg of the retainer, forming a bridle joint relationship. The retainer, when inserted, prevents outward flexure of the top sides.

In order to open or close either side of the camping means, the retainer is first removed from the mortises. Either side of the clamping means can be opened or closed in any sequence. After both top sides have been closed, and the tubes are ready for welding, the retainer is placed into the mortises. A mortise set, comprising of two parallel mortises, can be formed at any point in the top sides of the clamping means. Multiple mortise sets can be formed, to allow the clip to be placed in varying locations, depending on the setup. Additionally, multiple retainers and mortise sets may be used in a weld setup. To prevent loss of the retainer, a lanyard can connect the retainer to the clamping means, the orbital welding device, or any other acceptable nearby object.

BRIEF DESCRIPTION OF THE DRAWINGS

FIGS. 1A-B are front and isometric views of the present invention, showing a single clasp.

FIGS. 2A-B are front and isometric views of the present invention, showing a both clasps in the engaged mode.

DESCRIPTION OF THE PREFERRED EMBODIMENTS

Figure 3:
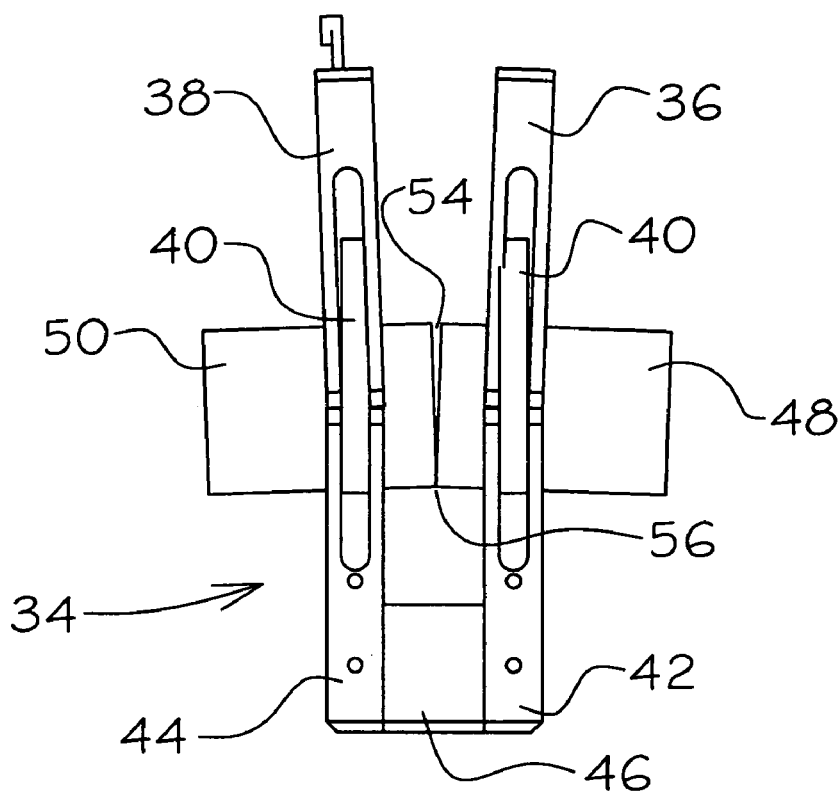
FIG. 3 is a plan view of an existing clamping means design, showing outward flexure under load.

The detailed description set forth below in connection with the appended drawings is intended as a description of presently-preferred embodiments of the invention and is not intended to represent the only forms in which the present invention may be constructed and/or utilized. The description sets forth the functions and the sequence of steps for constructing and operating the invention in connection with the illustrated embodiments. However, it is to be understood that the same or equivalent functions and sequences may be accomplished by different embodiments that are also intended to be encompassed within the spirit and scope of the invention.

The clasp (20) of the present invention can be seen in FIGS. 1A and 1B. Looking more particularly at FIG. 1A, it can be seen that, generally, from the front face, the shape of the clasp (20) is a square cornered J-shape. The clasp (20) in comprised of two legs, the mounting leg (22) and the engaging leg (24), and an engaging notch (26) formed between. Countersunk holes (28) are formed through the engaging leg (22) in two places. The countersunk holes (28) can receive screws for mounting. The position of the countersunk holes (28) allows for the upright or inverted mounting of the clasp (20) A perspective view of the clasp (20) can be more clearly seen in FIG. 1B.

A right clasp (30) and a left clasp (32) can be seen in the engaged configuration in FIGS. 2A-B. The right clasp (30) and the left clasp (32) are duplicate parts, and can be manufactured as the same part, using standard machining techniques known in the industry. The right clasp (30) is positioned upright, with the engaging notch (26) opening upwardly. The left clasp (32) is positioned in an inverted fashion, as compared to the right clasp (30). The engaging leg (24) of the right clasp (30) is received by the engaging notch (26) of the left clasp (32); and the engaging leg (24) of the left clasp (32) is, in turn, received by the engaging notch (26) of the right clasp (30). The engagement face (18) of the right clasp (30) is substantially planar parallel to the engagement face (18) of the left clasp (32), with a sufficient gap between the two for engagement clearance.

The design of the engaging notch (26) and the engaging leg (24) permits the mating of the right clasp (30) with the left clasp (32), without significant mechanical interference. The width of the engaging leg (24) should be less than the width of the engaging notch (26). The length of the engaging leg (24) should be less than the depth of the engaging notch (26). Additionally, the gap between the engaging leg (24) and the engaging notch (26) should be sufficiently wide to allow the left clasp (32) to rotate into the engaged configuration with the right clasp (30), or vice versa.

The current problem of the right top side (36) and the left top side (38) pivoting out as a result of the weight of tubes (48) and (50), can be more clearly understood when viewing FIG. 3. The right bottom side (42) and the left bottom side (44) of the clamping means (34) are fastened directly to the spacer (46), forming a relatively stable base. The right top side (36) and the left top side (38) are pivotally attached to the right bottom side (42) and the left bottom side (44) respectively, through the hinges (40). Due to the outward flexure of the right top side (36) and the left top side (38), under load, an undesirable gap (54) is formed between the tubes (48) and (50). The hinges (40) do not provide the lateral support to the right top side (36) and the left top side (38) required to prevent this flexure.

Figure 4:
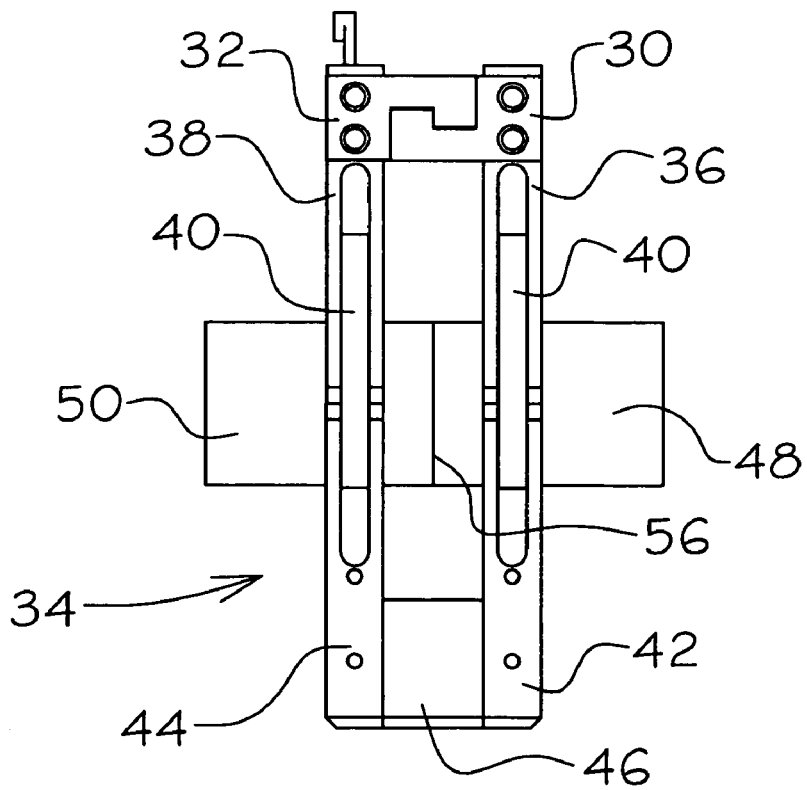
FIG. 4 is a plan view of the present invention installed on an existing clamping means design, preventing outward flexure under load.

The present invention can be seen installed on a clamping means (34) in FIG. 4. The right clasp (30) is fastened upright to the right top side (36); and the left clasp (32) is fastened invertible to the left top side (38). Both clasps are installed on the hinge side of the clamping means (34). When under load, with both tubes (48) and (50) secured within the clamping means (34), the engaging leg (24) of the right clasp (30) contacts the engaging leg (24) of the left clasp (32), the engaging faces (18) touching.

The mutual contact between the engaging legs (24), prevents the right top side (36) and the left top side (38) from pivoting away from one another. The right top side (36) and the left top side (38) are, as a result, substantially parallel, even with the weight of the tubes (48) and (50) producing an outward stress on them. The right clasp (30) and the left clasp (32) bear the stress produced by the weight of the tubes (48) and (50), and prevent any outward flexure of the right top side (36) and the left top side (38).

When look more particularly at the seam (56), formed between the tubes (48) and (50), it can be seen that no gap (54) is present. The outward flexure is significantly prevented by the mutual support of the right clasp (30) and the left clasp (32), resulting in a substantially parallel face to face contact between the annular face of tube (48) and the annular face of tube (50). This proper tube (48) and (50) alignment provides a setup that is in condition for welding.

Figure 5A:
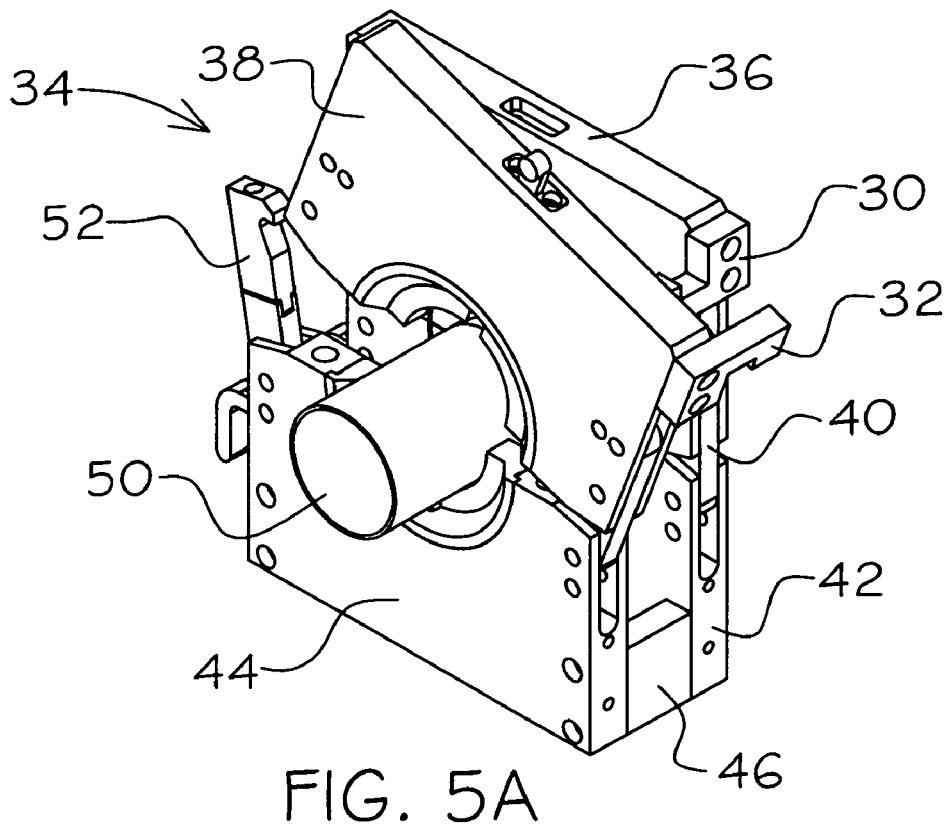
FIGS. 5A-B are isometric views of the present invention, with the clamping means in the open position.
Figure 5B:
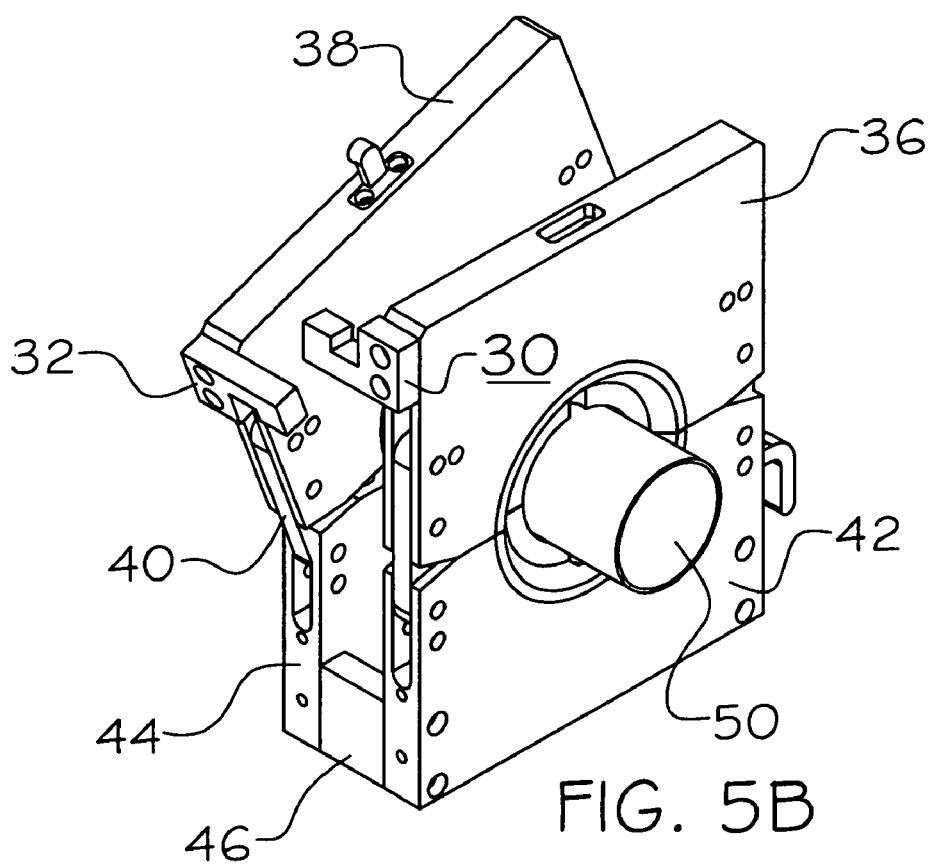

The operation of the present invention can be clearly seen in FIGS. 5A-B. The right clasp (30) and the left clasp (32) are mounted to a clamping means (34), on the hinge (40) side, preferably at a point furthest away from the hinge (40). The right clasp (30) and the left clasp (32) are both mounted so that the engaging faces (18) are substantially parallel to the plane of rotation of their respective top sides (36) and (38) about the hinges (40).

When the latch (52) is released, as illustrated, and the left top side (38) is rotated open, the left clasp (32) clears the right clasp (30) without significant mechanical interference. Likewise, the right top side (36) can be rotated open, while the left top side (38) remains closed, without significant mechanical interference between the right clasp (30) and the left clasp (32). Additionally, both the right top side (36) and the left top side (38) can be rotated open or closed at the same time or in any sequence.

Figure 6:
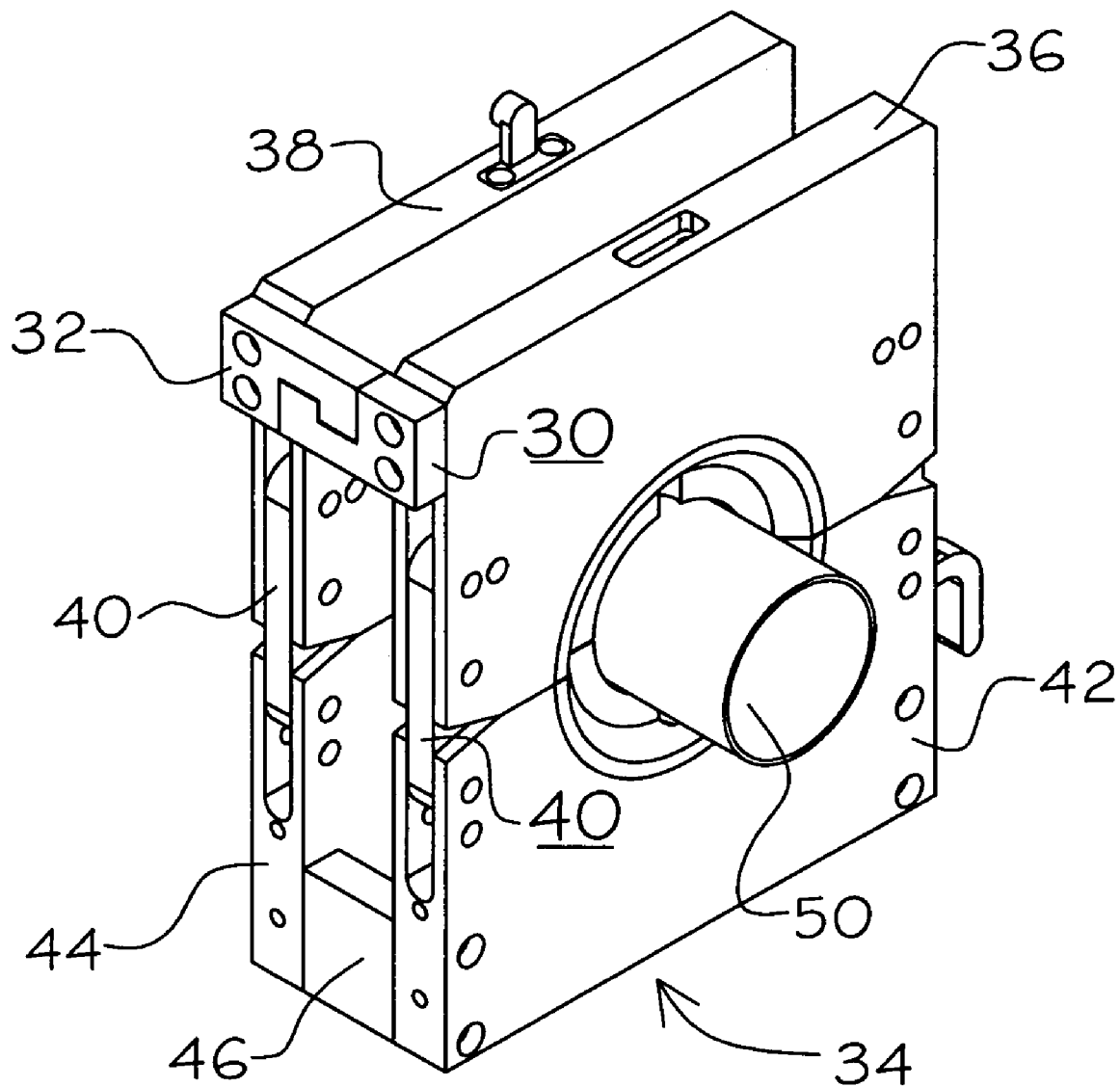
FIG. 6 is an isometric view of the present invention, with the clamping means in the closed position.

FIG. 6 illustrates the right clasp (30) and the left clasp (32) mounted to a clamping means (34) with a tube (50) and a second tube (48) (hidden) held firmly in abutment. The right top side (36) and the left top side (38) are in the closed position, ready to receive an orbital welding means.

Figure 7A:
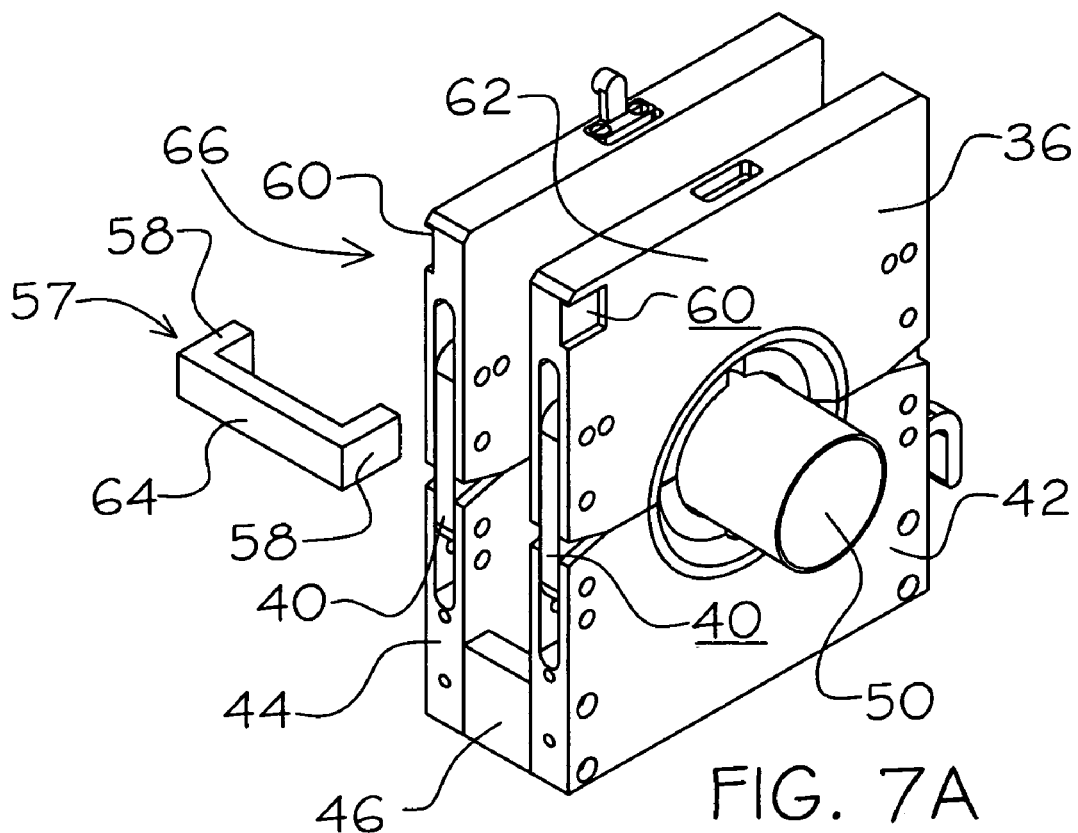
FIGS. 7A-B are isometric views of and alternate embodiment of the present invention.
Figure 7B:
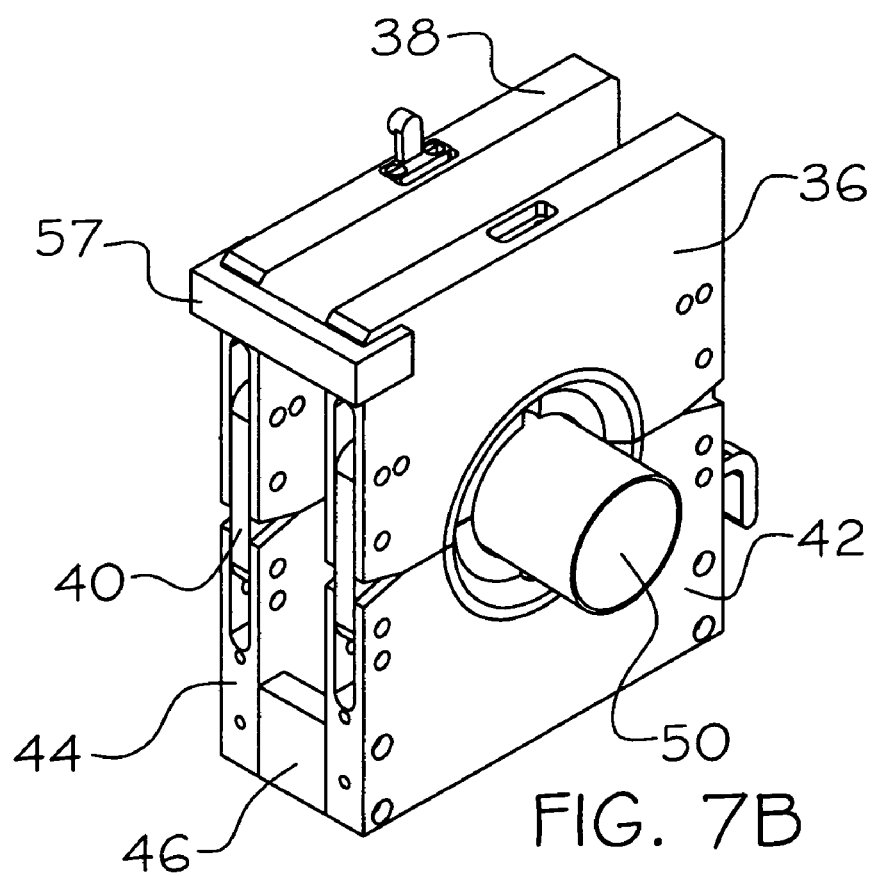

An alternate embodiment of the present invention can be seen in FIGS. 7A-B. Looking more particularly at FIG. 7A, a retainer (57) is shown. The retainer (57), from the front face view, has a square cornered U-shape, with both legs of the U having approximately the same length, although differing leg lengths are also possible. The material and overall thickness are sufficient to withstand, without substantial deformation, the effects of the weight of tubes held within a clamping means (34).

A clamping means (34) modified to receive the retainer (57) can be seen in FIG. 7B. A mortise (60) is formed on the outside face (62) of right top side (36) and the left top side (38) of the clamping means (34), both mortises (60) are in approximately the same position on their respective top sides and also parallel. Each mortise (60) receives one leg (58) of the retainer (57), forming a bridle joint relationship. The width of the web (64) formed between the two legs (58) of the retainer (57) should be of sufficient length to span across the spacer (46), to the bottom of the mortises (60) formed on each side.

In order to open or close either side of the camping means (34), the retainer (56) is first removed from the mortises (60). Either side of the clamping means (34) can be opened or closed in any sequence. After both top sides (36) and (38) have been closed, and the tubes (48) and (50) are ready for welding, the retainer (57) is placed into the mortises (60). The retainer (57), when inserted, prevents outward flexure of the top sides (36) and (38).

A mortise set (66), comprising of two parallel mortises (60), can be formed at any point in the top sides (36) and (38) of the clamping means (34). Multiple mortise sets (66) can be formed, to allow the retainer (57) to be placed in varying locations, depending on the setup. Additionally, multiple retainers (57) and mortise sets (66) may be used in a weld setup. To prevent loss of the retainer (57), a lanyard can connect the retainer to the clamping means (34), the orbital welding device, or any other acceptable nearby object.

While the present invention has been described with regards to particular embodiments, it is recognized that additional variations of the present invention may be devised without departing from the inventive concept.

Having thus described the invention, it is now claimed:

1. A clamping means support mounted to and providing support to a clamping means of an orbital tube welder, preventing substantial movement between a first tube and a second tube held in abutment within said clamping means, comprising:

a first clasp side having a first mounting leg, a first engaging leg substantially parallel to said first mounting leg, and a first web extending substantially normal between said first mounting leg and said first engaging leg, a first engaging notch being defined by said first mounting leg, said first engaging leg, and said first web;

a second clasp, said second clasp having a second mounting leg, a second engaging leg substantially parallel to said second mounting leg, and a second web extending substantially normal between said second mounting leg and said second engaging leg, a second engaging notch being defined by said second mounting leg, said second engaging leg, and said second web;

said first mounting leg of said first clasp is fixed to said swiveling first top side and configured to extend into said space, and said second mounting leg of said second clasp is fixed to a said swiveling second top side and configured to extend into said space, said second clasp being mounted in an inverted relationship to said right first clasp;

when said swiveling first top side and said swiveling second top side are in a closed configuration, said first engaging leg intermeshes within said second engaging notch, and said second engaging leg intermeshes within said first engaging notch, the intermeshing occurring between the first and second mounting legs, substantially preventing lateral and angular movement of said swiveling first top side and said swiveling second top side of said clamping means, relative one to the other;

said first clasp being configured to interlock with said second clasp in said closed configuration and being configured to permit the selective opening of either side, without substantial disassembly and rearrangement of parts.

2. The clamping means support of claim 1 wherein said first clasp is substantially identical to said second clasp.

3. The clamping means support of claim 1 wherein said first clasp and said second clasp having generally a square cornered J-shaped front face geometry.

4. The clamping means support of claim 1 wherein said first clasp and said second clasp having generally a square cornered U-shaped front face geometry.

5. An interlocking weld fixture support configured to be mounted to and selectively couple a first side and a second side of a clamping means of an orbital tube welder for substantial prevention of flexure between said first side and said second side in preparation for and during a welding operation of a pair of tubes clamped in abutment therewithin, comprising:

a first clasp side having first mounting portion and a first engaging portion and being mounted to said first side by said first mounting portion;

a second clasp side having second mounting portion and a second engaging portion and being mounted to said second side by said second mounting portion;

said first engaging portion being configured to interlock with said second engaging portion in a closed configuration, the interlocking occurring between the first and second mounting portions, and being configured to permit the selective opening of either side, without substantial disassembly and rearrangement of parts.

* * * * *